US012696326B2

(12) United States Patent　　　　(10) Patent No.:　US 12,696,326 B2

Hochdorf et al.　　　　　　　　　　(45) Date of Patent:　　　Jul. 28, 2026

(54) FREQUENCY HOPPING SCHEME FOR IMPROVED OPERATION IN CONGESTED ENVIRONMENTS

(71) Applicant: Skydio, Inc., San Mateo, CA (US)

(72) Inventors: Eyal Hochdorf, Palo Alto, CA (US); Abraham Galton Bachrach, Emerald Hills, CA (US)

(73) Assignee: Skydio, Inc., San Mateo, CA (US)

( * ) Notice: Subject to any disclaimer, the term of this patent is extended or adjusted under 35 U.S.C. 154(b) by 387 days.

(21) Appl. No.: 18/200,500

(22) Filed: May 22, 2023

(65) Prior Publication Data

US 2023/0379983 A1　　Nov. 23, 2023

Related U.S. Application Data

(60) Provisional application No. 63/344,125, filed on May 20, 2022.

(51) Int. Cl.
H04W 76/10 (2018.01)
H04W 84/06 (2009.01)

(52) U.S. Cl.
CPC ............ H04W 76/10 (2018.02); H04W 84/06 (2013.01)

(58) Field of Classification Search
CPC .............................. H04W 76/10; H04W 84/06
USPC ........................................................ 370/329
See application file for complete search history.

(56) References Cited

U.S. PATENT DOCUMENTS

| 2019/0288767 | A1 * | 9/2019 | Wang | H04W 16/12 |
| 2020/0068575 | A1 * | 2/2020 | Jiang | H04W 72/54 |
| 2020/0100187 | A1 | 3/2020 | Balasubramanian et al. | |
| 2020/0287633 | A1 * | 9/2020 | Silverman | H04B 17/382 |
| 2021/0075580 | A1 * | 3/2021 | Thubert | H04W 72/542 |
| 2023/0108038 | A1 * | 4/2023 | Kim | G08G 5/22 |
| | | | | 342/450 |
| 2023/0354397 | A1 * | 11/2023 | Hathi | H04L 5/006 |

OTHER PUBLICATIONS

Jaafar et al, "Multiple Access in Aerial Networks: From Orthogonal and Non-Orthogonal to Rate-Splitting," in IEEE Open Journal of Vehicular Technology, vol. 1, pp. 372-392, 2020 (Year: 2020).*
International Application No. PCT/US2023/023048, International Search Report, Written Opinion, 13 pages, Sep. 29, 2023.

(Continued)

*Primary Examiner* — Christopher B Robinson
*Assistant Examiner* — Chong G Kim

(57)　　　　ABSTRACT

Technology is disclosed herein for a method of operating a UAV as an access point for communication with one or more ground controllers and/or one or more other UAVs. In an implementation, a UAV establishes a connection, including an uplink and downlink, between the UAV and a ground controller such that the UAV is an access point with respect to the ground controller. The connection is established in accordance with a wireless protocol that divides the RF spectrum into bands of resource units with respect to uplinks and downlinks between access points and non-access points. The UAV identifies a single resource unit (RU) to support uplink traffic and instructs the ground controller to transmit uplink traffic on the single resource unit. The UAV receives uplink traffic from the ground controller on the single resource unit.

20 Claims, 9 Drawing Sheets

(56) References Cited

OTHER PUBLICATIONS

Kang, Honggu et al., "Protect Your Sky: A Survey of Counter Unmanned Aerial Vehicle Systems," IEEE Access, vol. 8, pp. 168671-168710, Sep. 11, 2020.
Rohde, Sebastian et al., "Ad Hoc Self-Healing of OFDMA Networks Using UAV-Based Relays," Ad Hoc Networks, vol. 11, Issue 7, pp. 1893-1906, Sep. 2013.

* cited by examiner

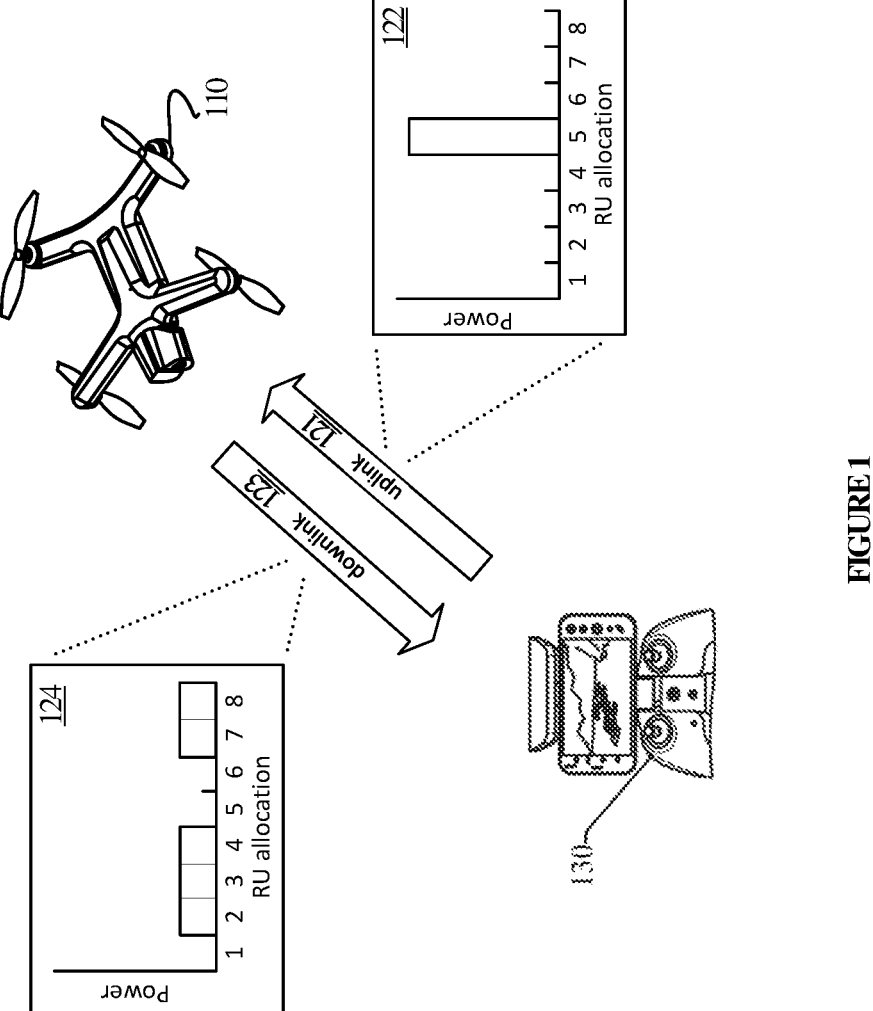
FIGURE 1

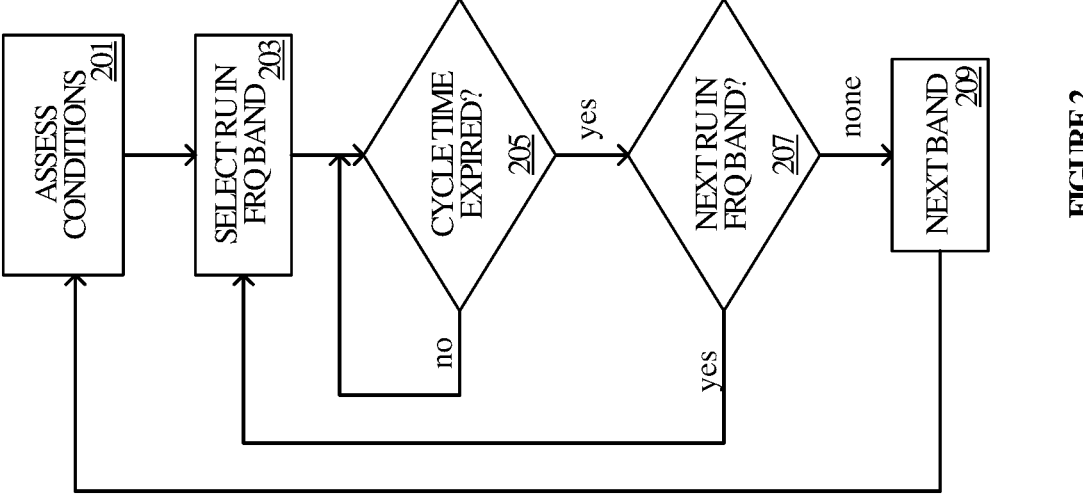
FIGURE 2

803

| B0-B3 | B4-B15 | B16 | B17 | B18-B19 | B20-B21 | B22 | B23-B25 | ... |
|---|---|---|---|---|---|---|---|---|
| Trigger Type | UL Length | More TF | CS Req'd | UL BW | GI and HE-LTF Type | MU-MIMO HE-LTF mode | # of HE-LTF symbols and midamble periodicity | |
| 4 | 12 | 1 | 1 | 2 | 2 | 1 | 3 | |

Bits:

| B26 | B27 | B28-B33 | B34-B35 | B36 | B37-B52 | B53 | B54-B62 | | |
|---|---|---|---|---|---|---|---|---|---|
| UL STBC | LDPC extra symbol segment | AP Tx Power | Pre-FEC padding factor | PE disambiguity | UL spatial reuse | Doppler | UL HE-SIG-A2 Reserved | Reserved | Trigger dependent common info |
| 1 | 1 | 6 | 2 | 1 | 16 | 1 | 9 | 1 | var |

Bits:

801

| Frame Control | Duration | RA | TA | Common info | User info | User info | ... | User info | Padding | FCS |
|---|---|---|---|---|---|---|---|---|---|---|
| 2 | 2 | 6 | 6 | 8 or more | 5 or more | 5 or more | | 5 or more | var | 4 |

Octets: 2

805

| B0-B11 | B12-B19 | B20 | B21-B24 | B25 | B26-B31 | B32-B39 | B40 | |
|---|---|---|---|---|---|---|---|---|
| AID12 | RU Allocation | UL FEC coding type | UL HE-MCS | UL DCM | SS Allocation/ RA-RU info. | UL Target Receive Power | Reserved | Trigger Dependent User info |
| 12 | 8 | 1 | 4 | 1 | 6 | 7 | 1 | var |

Bits:

FIGURE 8

800

FREQUENCY HOPPING SCHEME FOR IMPROVED OPERATION IN CONGESTED ENVIRONMENTS

RELATED APPLICATIONS

This application is related to and claims the benefit of priority to U.S. Provisional Patent Application No. 63/344,125, entitled FREQUENCY HOPPING SCHEME FOR IMPROVED OPERATION IN CONGESTION ENVIRONMENT, and filed on May 20, 2022, the contents of which are hereby incorporated by reference in their entirety.

TECHNICAL FIELD

Various implementations of the present technology relate to communication with unmanned aerial vehicles (UAVs).

BACKGROUND

Unmanned aerial vehicles (UAVs) or drones rely on wireless communication to send and receive real-time data, such as receiving flight control commands when the vehicle is being active piloting or transmitting a livestream video feed for display on a smartphone. In many environments where drones are operated, drones will encounter a challenging background of radio frequency (RF) interference which impacts their ability to communicate with a base station or ground controller. For example, in suburban areas, a drone flying overhead will encounter RF signals from devices such as Wi-Fi routers, cellular devices, wireless security systems, and the like, but also from less sophisticated devices such as microwave ovens, baby monitors, and garage door openers.

In addition to these are environmental sources, such as power lines, radio or cellular towers, and other sources of electromagnetic interference, but also structures such as buildings which block, reflect, or amplify RF signals. Moreover, there is an ever-increasing number of IoT devices in use which further contribute to RF congestion and interference. This noisy environment impacts the ability of the drone to communicate reliably with its ground station by degrading the quality of communications in terms of reduced signal strength, bit rate errors, and lost data packets.

To provide reliable communication between a drone and a ground station or controller, drones may employ channel switching—switching from one channel to another when RF interference causes excessive signal degradation. However, when flying in an area with a rapidly changing RF profile, frequent channel switching can itself be a disruptive process which causes latency or interruption in communications. Channel switching may also result in switching to a more congested channel. Moreover, as battery life of drones improves, longer flight range of drones become feasible. But as flight ranges increase, the signal quality of communications between drones and ground stations becomes increasingly vulnerable to external interference, creating an additional challenge for maintaining communication with a ground station.

Overview

Systems, methods, and software are disclosed herein for a method of operating a UAV as an access point for communication with one or more ground controllers and/or other UAVs. In an implementation, a UAV establishes a connection, including an uplink and downlink, between the UAV and a ground controller such that the UAV is an access point with respect to the ground controller. The connection is established in accordance with a wireless protocol that divides the RF spectrum into bands of resource units with respect to uplinks and downlinks between access points and non-access points. The UAV identifies a single resource unit (RU) to support uplink traffic. The UAV instructs the ground controller to transmit uplink traffic on the single resource unit and receives uplink traffic from the ground controller on the single resource unit.

In an implementation, the wireless protocol includes orthogonal frequency division multiple access (OFDMA), and the resource unit includes a group of sub-carrier frequencies in the RF spectrum. In an implementation, the UAV identifies one or more resource units to carry downlink traffic and transmits downlink traffic to the ground controller on the one or more resource units.

In an implementation, the UAV periodically identifies a new resource unit to support uplink traffic. The UAV instructs the ground controller to transmit uplink traffic on the new resource unit and receives uplink traffic on the new resource unit.

In an implementation, the UAV instructs the ground controller to transmit the uplink traffic on the single resource unit and only on the single resource unit.

In an implementation, the UAV serves as an access point with respect to one or more other UAVs and one or more other ground controllers. In the same or other implementations, the UAV establishes a second connection with a second ground controller in accordance with the wireless protocol such that the second connection includes a second uplink and a second downlink. The UAV identifies a second resource unit in a second band of resource units to support second uplink traffic. The UAV instructs the second ground controller to transmit the second uplink traffic on the second single resource unit and receives the second uplink traffic from the second ground controller on the second single resource unit.

In the same or other implementations, the UAV establishes a third connection, including a third uplink and a third downlink, with a second UAV in accordance with the wireless protocol. The UAV receives third uplink traffic from the second UAV on the third uplink and transmits third downlink traffic to the second UAV on the third downlink. In the same or other implementations, the third downlink traffic includes the second uplink traffic sent from the second ground controller to the UAV on the second uplink.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 1 illustrates an operational environment of operating an unmanned aerial vehicle in communication with a ground controller in an implementation.

FIG. 2 illustrates a method of frequency selection for communication between an unmanned aerial vehicle and a ground controller in an implementation.

Figure 3:
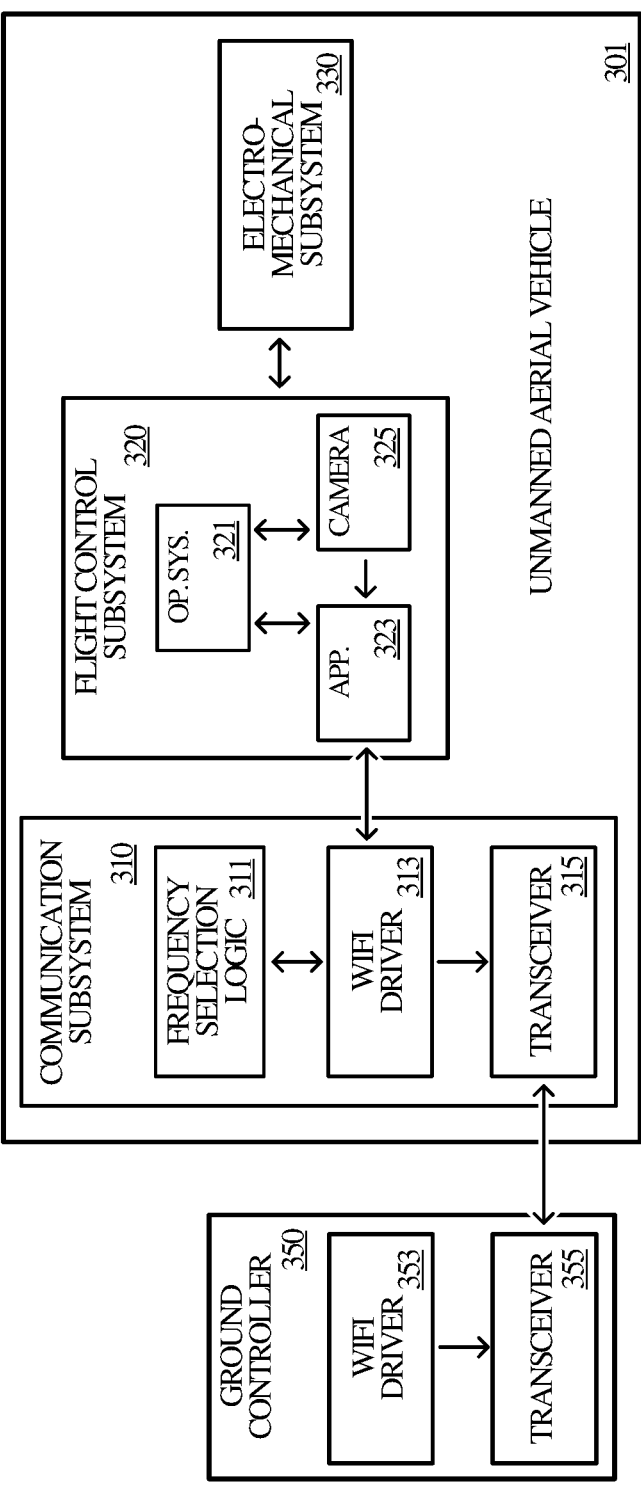

FIG. 3 illustrates a systems architecture of a UAV in an implementation.

Figure 4:
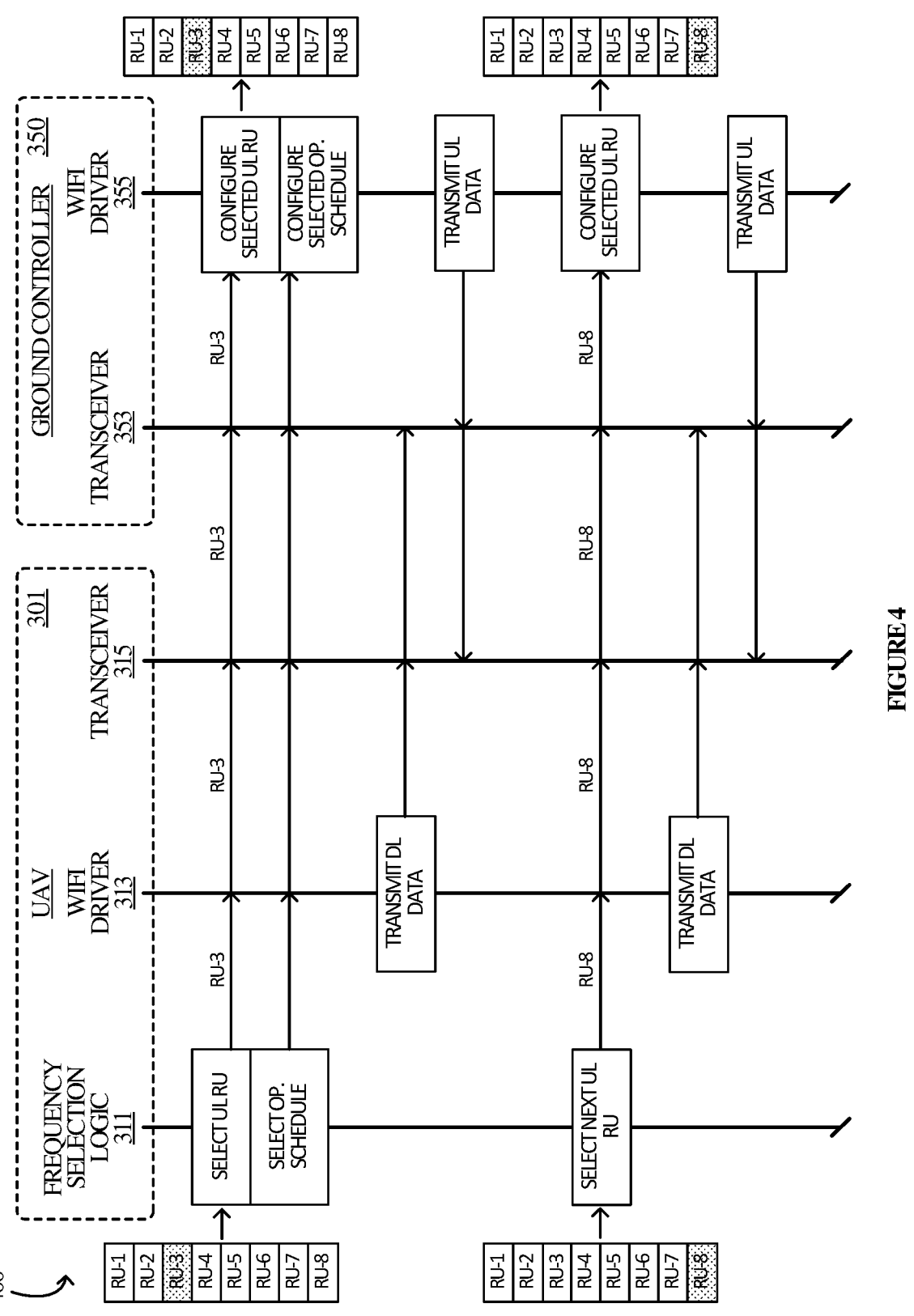

FIG. 4 illustrates an operational scenario of resource unit selection for communication between an unmanned aerial vehicle and a ground station in an implementation.

Figure 5:
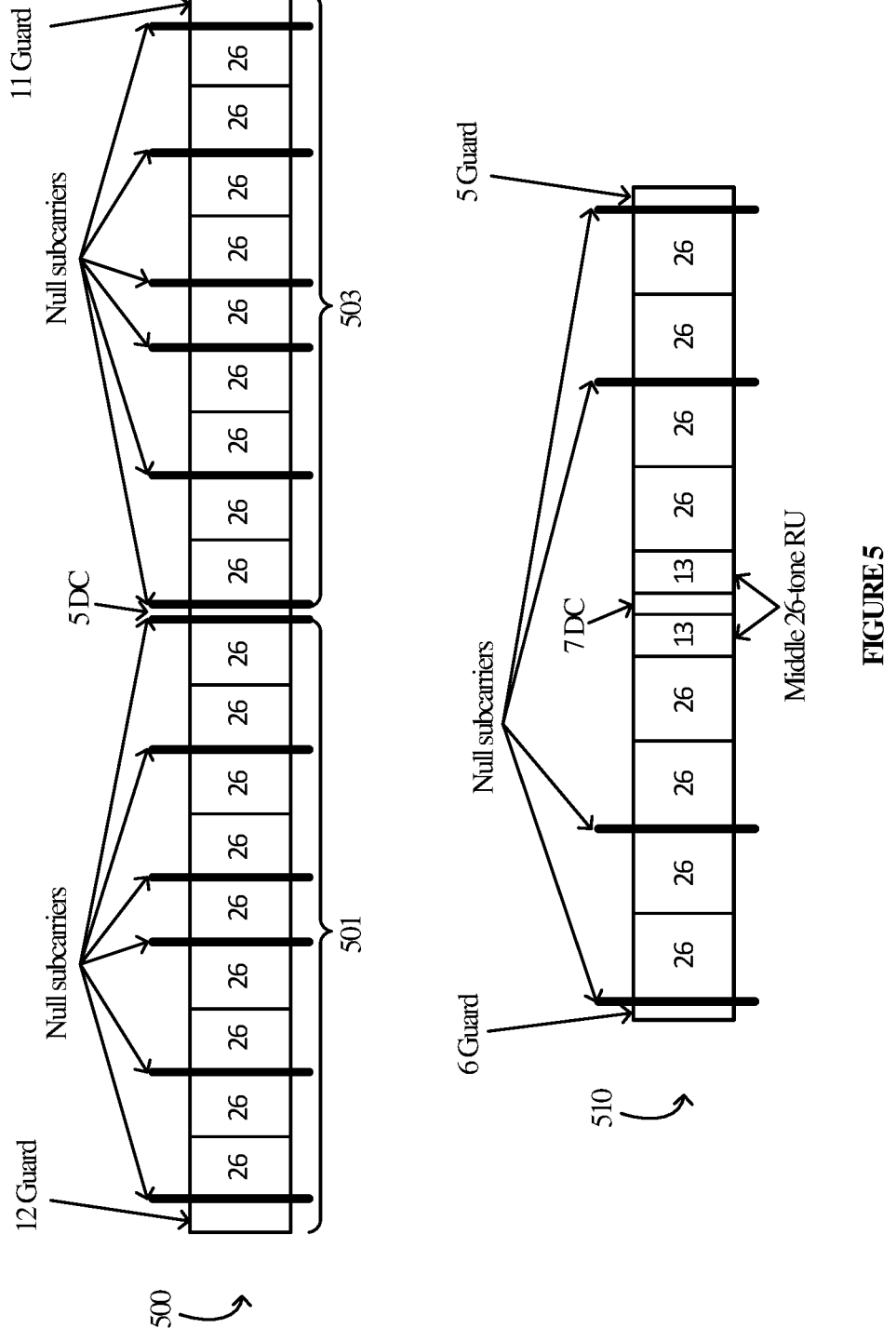

FIG. 5 illustrates spectrum allocation diagrams for RU-26 allocations in an implementation.

Figure 6:
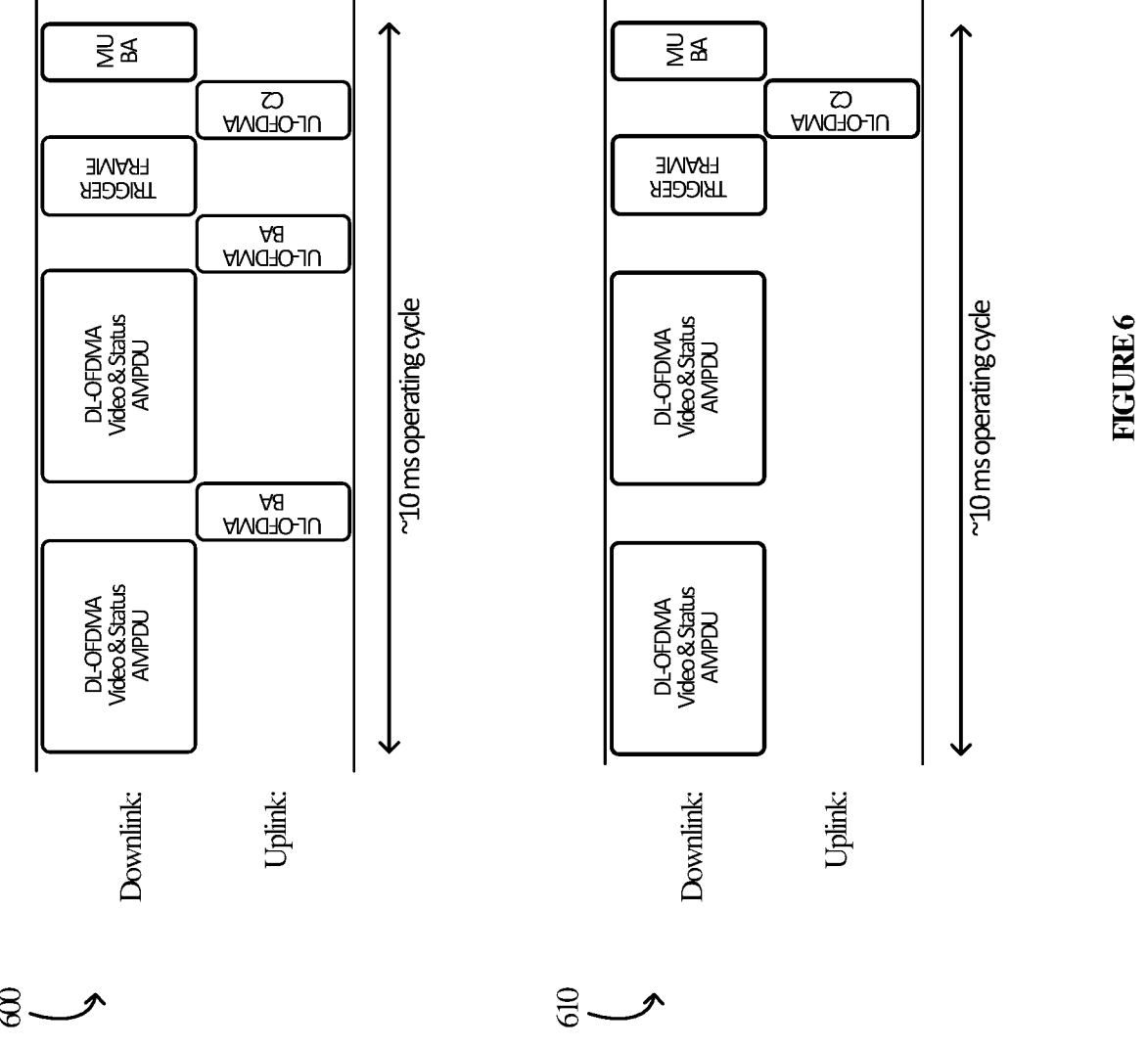

FIG. 6 illustrates operation schedules for communication between a UAV and a ground controller in an implementation.

Figure 7:
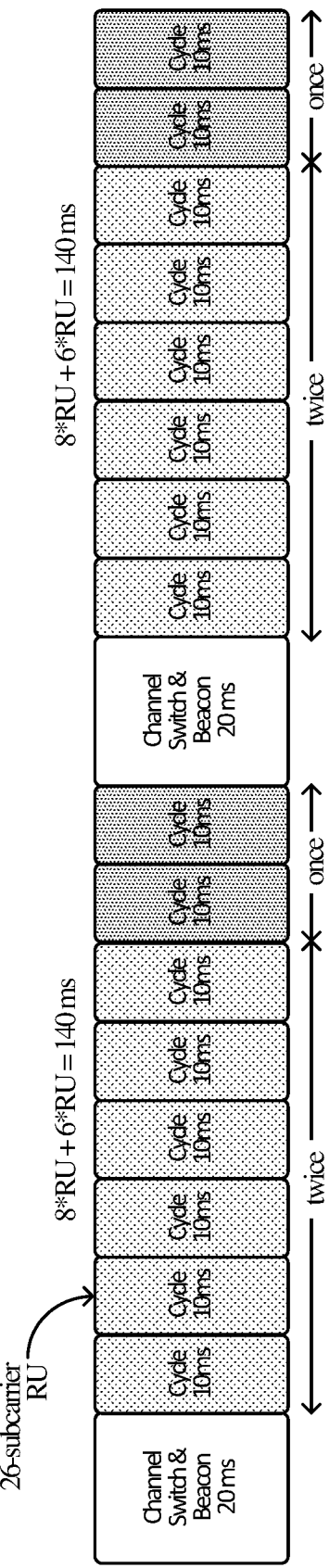

FIG. 7 illustrates a frequency hopping sequence for a single resource unit uplink in an implementation.

FIG. 8 illustrates a trigger frame PPDU sent by a drone to a ground controller in an implementation.

Figure 9:
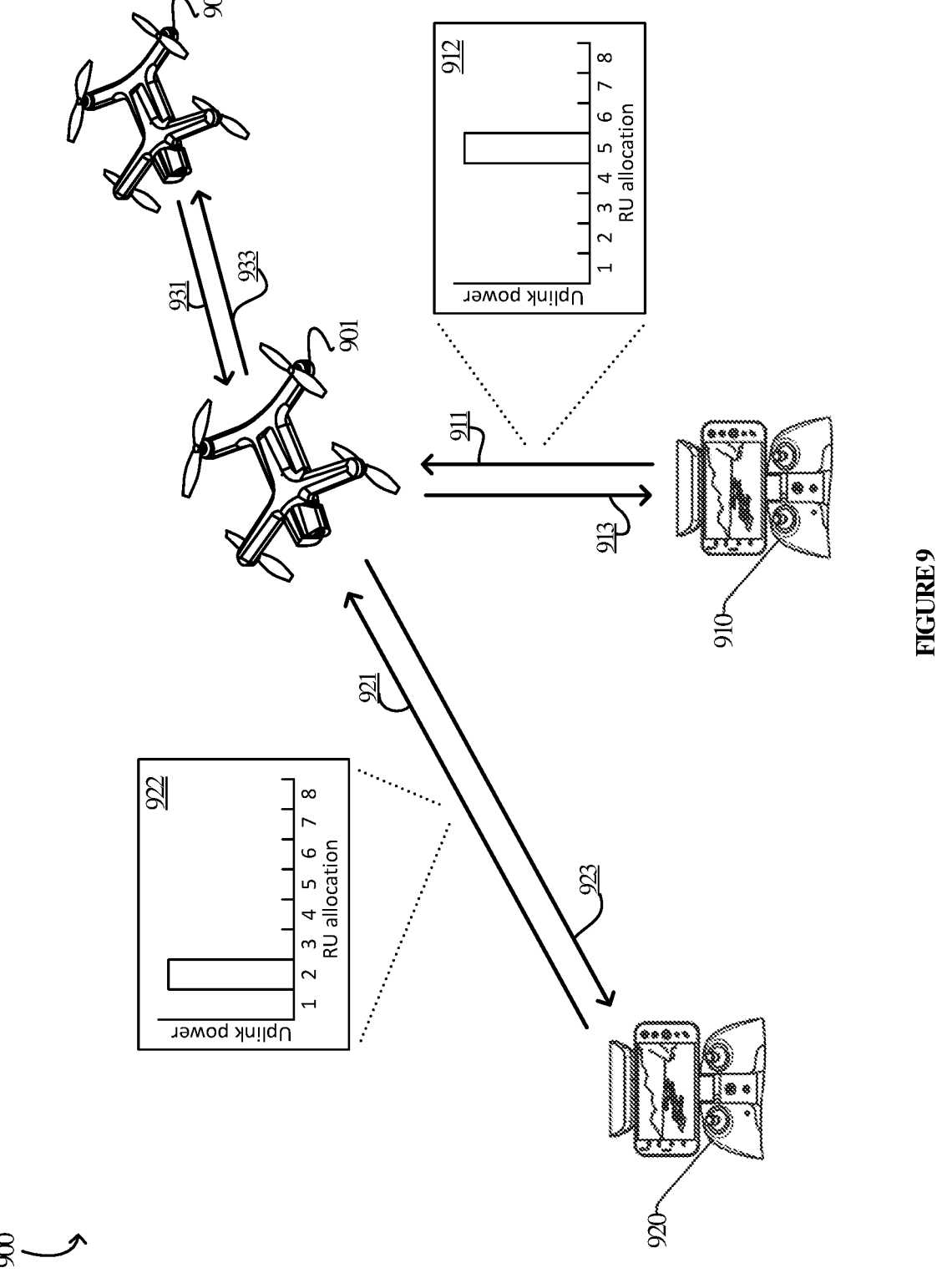

FIG. 9 illustrates an operational scenario of operating a UAV in communication with multiple ground controllers and other UAVs in an implementation.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The technology disclosed herein for improving wireless communication performance between a ground controller and a drone (i.e., UAV) when the drone is in flight. The drone establishes a connection with the ground controller which includes an uplink for transmitting command and control data from the ground controller to the drone and a downlink for transmitting video and vehicle status or operational data to the ground controller. The techniques described here are directed to selecting a frequency band for the uplink such that the uplink is isolated to and carried by a single resource unit (RU) of a frequency range while the downlink operates on frequency spectrum over a single, wide resource unit or over multiple smaller resource units. In some implementations, the UAV causes the uplink to periodically hop from one resource unit to another resource unit to comply with regulatory requirements which mandate frequency hopping.

In an implementation of the technology described herein, the drone, as an access point, connects with the ground controller via a Wifi 6 or 6E (802.11ax) channel at 2.4 GHz, 5 GHz, or 6 GHz using orthogonal frequency division multiple access (OFDMA). In an exemplary scenario, the uplink of the connection operates on a 2 MHz band of the 2.4 GHz channel while the downlink of the connection operates on a 40 MHz band of the 2.4 GHz channel. The asymmetry in communication capacity between the uplink and the downlink accords with the asymmetric usage: the uplink transmits command and control data to the drone, while the downlink carries a more substantial amount of data in the form of video data and vehicle operations or status information to the ground controller.

Moreover, when the drone flies above buildings, trees, and other ground objects, the uplink to the drone may be subjected to relatively high interference or congestion where the interference profile changes rapidly. Because the ground controller focuses its energy into a single resource unit for the uplink, this results in improved signal-to-noise ratio (SNR) and, therefore, more reliable uplink communication to the drone. In contrast, the downlink received by the ground controller is subject to a relatively lower level of interference due to shielding provided by objects on the ground such as buildings or vegetation, so the downlink can be divided amongst multiple resource units or carried on a single, wide resource unit of the downlink frequency range for greater throughput. In some scenarios, such as in environments of relatively constant interference, the connection between the drone and the ground controller may be carried on a 5 MHz or 10 MHz band of the 2.4 GHz channel.

According to the Wifi 6 standard, a frequency band can be subdivided into resource unit allocations of 26, 52, 106, 242, and higher depending on the bandwidth. For a 20 MHz HE PPDU (high efficiency PHY protocol data unit), there are 9 resource units available in an RU-26 allocation. For a 40 MHz HE PPDU, there are 18 resource units available in an RU-26 allocation. Each resource unit of an RU-26 allocation of a frequency band includes 26 subcarriers or tones corresponding to, approximately, a 2 MHz bandwidth (based on 78.125 kHz spacing per subcarrier), with a few subcarriers set aside for direct conversion and guard tones or as null tones.

The OFDMA scheme of Wifi 6 allows for simultaneous low-data-rate transmission between an access point and multiple clients of the access point by subdividing a frequency channel into multiple smaller frequency allocations called resource units (RUs). The access point assigns or switches each client to one or more resource units according to the transmission requirements and environmental conditions of each client. In an implementation, the drone, an access point, selects a resource unit to carry the uplink from the ground controller to the drone and signals the resource unit selection to the ground controller. Uplink and downlink communication are coordinated between the drone and the ground controller according to a schedule selected by the drone and signaled to the ground controller.

In some implementations, frequency hopping is required to comply with jurisdictional regulation. For example, regulatory requirements may limit the time and energy (i.e., power spectral density) for a carrier to carry a signal. In other situations, frequency hopping is used to optimize communication performance. To hop frequencies (i.e., RUs) for the uplink, the drone periodically switches between the different resource units of an allocation of resource units for carrying the uplink, with a single resource unit in use at any given time. For example, in a RU-26 allocation of a 20 MHz band, the drone may cause the uplink to hop between any of up to nine available resource units, while for a 40 MHz band, there are up to eighteen available resource units. To perform resource unit hopping (i.e., to switch from one RU to another), the access point (i.e., the drone) scans the frequency band to find a better resource unit if the current resource unit degrades or drops below a threshold level of communication performance. Re-selecting a resource unit during flight may occur on a periodic basis or based on a triggering event. In some implementations, frequency hopping or resource unit selection consults interference profiles at both the drone and the ground controller.

In some implementations, the drone, as the access point, selects an operating schedule or scheduling scheme for the uplink and downlink of its connection with the ground controller. The scheduling scheme may be defined for half-duplex uplink and downlink operation according to a one-second cycle time. The scheduling scheme may be chosen based on environmental conditions, SNR, modulation time, time to transmit packets, and so on.

In an implementation of an operating schedule, the drone sends a trigger frame to the ground controller which requests communication from the ground controller along with parameters for transmitting the uplink communication. The parameters can include the resource unit selected for the uplink, transmission duration, transmission power, and various fields such as a trigger frame control field specifying the type of trigger frame used, and a trigger sequence control field, as well as other parameters. In response to receiving the trigger frame from the drone, the ground controller sends its command and control information in an uplink PPDU according to the parameters of the trigger frame.

In an implementation of resource unit hopping, regulatory requirements effectively limit carrier utilization (e.g., dwell time) to 10% of the observation time, which is the period of time the transmitter observes the channel state. For a one-second observation time, the dwell time is 10 milliseconds. Thus, a scheduling scheme may be defined for 10-millisecond duty cycles, meaning the uplink resource unit is switched every 10-milliseconds. In one exemplary scenario, within a 10-millisecond duty cycle, the uplink may carry two acknowledgements of downlink transmissions at 0.1 milliseconds per acknowledgement and one command and control transmission for 0.5 milliseconds, totaling approximately 0.7 milliseconds. Alternatively, the uplink resource unit may transmit just a single command and control signal for approximately 0.5 milliseconds with no acknowledgements.

In other implementations, an occupancy requirement may specify that a hopping frequency of a hopping sequence is not to exceed 4*(dwell time)*(# of RUs). If eight resource units are available for uplink switching, for a 10-ms dwell time, the result is a hopping frequency of 320 milliseconds. To comply with this requirement, the 320-second interval is divided into two 160-millisecond cycles, one for each of two 20 MHz bands of a 40 MHz frequency band. Setting aside 20 milliseconds for channel switching, this leaves 140 milliseconds of resource unit cycling. Thus, based on a 10-ms duty cycle per resource unit, 14 resource units may be used per 20-MHz hopping sequence, which in turn means that six of the eight resource units are used twice, and two of the eight resource units are used once on each 20 MHz band.

Turning now to the Figures, FIG. 1 illustrates operational environment 100 of a UAV in communication with an access point in an implementation. FIG. 1 includes vehicle 110 in wireless communication with ground controller 130.

Vehicle 110 is representative of a UAV or drone capable of communicating with ground controller 130 over a wireless communication network. Vehicle 110 includes a communication subsystem for communicating with ground controller 130 which includes logic by which to select frequencies for communication with ground controller 130 via uplink 121 and downlink 123 according to the technology disclosed herein. Frequency selection logic of the communication subsystem includes a functionality to scan communication frequencies to communicate with ground station 130 and generate an interference profile, SNR data, etc. The communication subsystem of vehicle 110 may be implemented in software and hardware including transmitters, receivers, antennas, and signal converters. Communication between vehicle 110 and ground controller 130 may be carried by data links (i.e., uplinks and downlinks) transmitting digital data via RF, satellite, cellular, Wifi (e.g., Wifi 6/6E), Bluetooth, or other communication channels according to communication protocols such as TCP/IP. Data transmitted between vehicle 110 and ground controller 130 can include flight command and control instructions, sensor data, imagery, video, and telemetry data. Data exchanged between vehicle 110 and ground station 130 may be encrypted or encoded to protect the data and prevent unauthorized access.

Vehicle 110 also includes a flight control subsystem which controls the movement, stability, and orientation of vehicle 110 in flight. The flight control subsystem, implemented in hardware and software onboard vehicle 110, includes a flight controller which integrates a flight plan or flight path with onboard sensor data from devices such as inertial measurement units, GPS (Global Positioning System) sensors, and environmental sensors, to generate flight control commands for the electromechanical subsystem. The electromechanical subsystem includes an electronic speed controller, rotors, and battery system to fly vehicle 110 according to the flight commands provided by the flight control subsystem.

Ground controller 130 is representative of a base station, ground station, or remote controller in communication with vehicle 110 via RF, satellite, cellular, Wifi (e.g., Wifi 6/6E)+, Bluetooth, or other wireless communication channels. Ground controller 130 may be a dedicated device, or it may be an application on a mobile computing device such as a smart phone, tablet or laptop computer. Ground controller 130 may include functionality by which to perform a scan of communication frequencies to communicate with vehicle 110 and generate an interference profile (e.g., a profile indicating a level of interference according to frequency), SNR data, etc.

In an operational scenario, vehicle 110 launches from a docking station or launch pad. During flight, vehicle 110 communicates with ground station 130 via downlink 123 to transmit video data captured by onboard sensors (e.g., cameras) and operational status information. Vehicle 110 receives command and control data (e.g., flight or operation instructions) from ground controller 130 via uplink 121. Uplink 121 and downlink 123 are carried on Wifi 6/6E (802.11ax) frequencies, such as in the 2.4 GHz range. Vehicle 110 remains in communication with ground controller 130 over ranges of 10-15 kilometers.

As vehicle 110 is in flight, it may encounter RF environments with high levels of interference or congestion along with rapidly changing interference profiles on the Wifi frequencies. Vehicle 110 selects one or more resource units for transmitting downlink data via downlink 123 according to environment conditions, as illustrated in downlink profile 124. Vehicle 110 also selects a single resource unit for transmitting uplink data via uplink 121 according to environmental conditions, as illustrated in uplink profile 122. Vehicle 110 periodically reevaluates environmental conditions to reassign or reschedule resource unit selection according to regulatory constraints and/or environmental conditions. When vehicle 110 selects a new frequency band for uplink 121 or downlink 123, vehicle 110 transmits this information to ground controller 130.

In an implementation, for receiving uplink data via uplink 121, vehicle 110 selects a 20 MHz central frequency or frequency band and selects a single resource unit for the frequency band of an RU-26 frequency sub-channelization or allocation. Upon indicating to ground controller 130 the selected resource unit, ground controller 130 transmits uplink data to vehicle 110 carried by the selected resource unit at a higher power to compensate for the relatively higher level of interference to which the vehicle is exposed, which is also sufficient for the smaller volume of uplink data carried to vehicle 110. Vehicle 110 may continually cycle through the resource units of the RU-26 allocation of the selected frequency band according to an operation schedule (e.g., one 10-millisecond cycle per resource unit), or vehicle 110 may cycle through the resource units of one frequency band, then hop to another band and cycle through the resource unit allocation for the new band.

In an implementation, to transmit downlink data via downlink 123, vehicle 110 may select one or more resource units of a selected frequency according to the environmental conditions. The selected downlink resource units may be one wider resource unit of, say, an RU-104 allocation or four resource units of an RU-26 allocation. Vehicle 110 transmits the downlink data carried by the selected resource units at a relatively lower power in accordance with the relatively lower level of interference to which the ground controller is exposed and with the larger volume of data carried by the downlink. Similar to the uplink scenario, vehicle 110 may continually cycle through resource units according to environmental conditions and/or regulatory constraints.

Technical effects of the technology disclosed herein enable long-range operation of drones in noisy RF environments. By focusing transmission power on a single resource unit for uplink communications, the SNR of the uplink is improved which allows for reliable data communication over greater distances. So, too, does the use of a single resource unit for uplink allow configuring the use to comply with regulatory requirements relating to frequency power and utilization in that a series of single uplink resource units can be selected from one or more frequency bands to comply with regulations while maintaining more reliable uplink communication.

Turning to FIG. 2, FIG. 2 illustrates process 200 implemented by an unmanned aerial vehicle, such as vehicle 110 of FIG. 1, to dynamically select resource units for communication with a ground controller, such as ground controller 130 of FIG. 1, in an implementation. Program instructions onboard vehicle 110 direct one or more computing devices to operate as follows, referring parenthetically to the steps in FIG. 2 In some implementations, process 200 may be performed on or by ground controller 130 in addition to or in place of performance on vehicle 110 with no loss of generality.

In operation, a vehicle scans the available frequency bands of a carrier frequency for communication with a ground controller to assess environmental conditions with respect to communication performance (step 201). In an implementation, the vehicle may perform the scan at launch or during flight. To scan a frequency or frequency band, the vehicle selects a channel and monitors transmissions on the channel from various sources of RF signals over a residence or dwell time (e.g., 15 milliseconds). During the scan, the vehicle records a set of scan data or metrics which quantify the RF signals received by the vehicle, such as SNR or an interference profile.

A frequency band of a carrier frequency may be subdivided into subchannels or resource units according to the Wifi 6/6E standard and OFDMA. For a 20 MHz band, a subdivision based on 26 subcarriers or tones results in nine resource units, each with a 2 MHz bandwidth (approximately). For a 40 MHz band, a subdivision based on 26 subcarriers or tones results in 19 resource units. In operational scenarios where the uplink data includes a relatively small quantity of data but the uplink carrier must penetrate a challenging resource unit environment, the vehicle may select a single resource unit of an RU-26 allocation to carry the uplink data and direct the ground controller to transmit the uplink data at a heightened power level for a stronger SNR.

Based on assessing environmental conditions, the vehicle selects a resource unit of the resource unit allocation of the carrier frequency (step 203). In an implementation, the vehicle may scan the resource unit allocation of the selected frequency band of the selected carrier frequency and select RU-4 of RUs 0-8. For example, the vehicle may select the 2.437 GHz carrier frequency with a 20 MHz bandwidth, i.e., 2.426 GHz to 2.448 GHz (i.e., channel 6). Within the 20 MHz frequency range, the vehicle may select a resource unit with a sideband or subcarrier range of −68.5:−42.5 from an allocation of nine 26-subcarrier resource units of the 20 MHz frequency range. The selected resource unit has a 2 MHz bandwidth (approx.). Having selected a single resource unit of the nine available resource units for the uplink, the other eight resource units are unused while the single selected resource unit is in use.

Continuing with process 200, having selected a resource unit for the uplink, the vehicle evaluates the resource unit selection against a resource unit cycle time (step 205). In an implementation, the ground station sends uplink data to the vehicle on the selected resource unit for a period of time according to an operation schedule. For example, the operation schedule may specify a 10-millisecond cycle time for the selected resource unit, after which the vehicle selects another resource unit for the uplink. The operational cycle may be determined at least in part by regulatory requirements for wireless communications. In the European Union and Japan, for example, regulations for frequency hopping specify limits on utilization and/or output power.

If the cycle time for the selected resource unit has expired, the vehicle determines, according to an operation schedule, whether another resource unit of the current resource unit allocation can be selected (step 207). In some jurisdictions, such as the European Union and Japan, regulations for wireless communication may limit the number of times a resource unit can be re-used within a given period of time. In some scenarios, the vehicle may also evaluate the availability of another resource unit based on environmental conditions. In either case, if the vehicle determines that another resource unit is available, the vehicle selects the available resource unit for the next cycle.

If the vehicle determines that no other resource units are available, the vehicle selects another frequency band for the uplink, and selects a new resource unit from the new frequency band (step 209). For example, the vehicle may select its first set of one or more resource units from a 20-MHz band of a 40 MHz frequency band. When the vehicle has cycled through the resource units of the 20-MHz band, the vehicle may hop to the other 20-MHz band of the 40 MHz band. By alternating bands and cycling through resource units within each band, the vehicle may continually use a single resource unit for the uplink while remaining in compliance with regulatory requirements.

Referring again to FIG. 1, operational environment 100 illustrates a brief example of process 200 as employed by vehicle 110 in an implementation. At launch, vehicle 110 performs a scan of available frequency bands or resource units for uplink and downlink communication with ground station 130. Vehicle 110 generates metrics for the scanned frequency bands based on interference data gathered for each band as it was scanned. Vehicle 110 then selects the first or best-performing resource unit for communication with ground station 130.

As illustrated in operational environment 100, based on an assessment of the RF environment, vehicle 110 selects RU-5 of an RU-26 allocation for uplink 121 and sends the resource unit selection to ground controller 130. Vehicle 110 also selects RUs 2-4 and 7-8 for downlink 123. As illustrated in uplink profile 122 and downlink profile 124, uplink 121 is transmitted at a relatively higher power than the power levels for downlink 123. The asymmetry in transmission characteristics between uplink 121 and downlink 123 reflect the asymmetries of the RF environment for the transmissions as well as the data load carried by the respective links. More specifically, because vehicle 110 may operate in an environment with significant exposure to RF interference, ground controller 130 transmits uplink data on a single but significantly more powerful resource unit for a stronger uplink SNR. So, too, is the uplink data, comprising mainly C2 data, typically a much smaller quantity than the downlink data. On the flip side, ground controller 130 may operate in an environment of relatively little RF interference, which obviates the need for a strong SNR for downlink 123. And for many typical scenarios, the downlink data carried by downlink 123 can include a significant amount of video data captured by one or more cameras onboard vehicle 110, such as for recording or livestreaming.

Turning now to FIG. 3, FIG. 3 illustrates systems architecture 300 of UAV 301, of which vehicle 110 of FIG. 1 is representative, in an implementation. Systems architecture 300 of UAV 301 includes communication subsystem 310, flight control subsystem 320, and electromechanical system 330.

Communication subsystem 310 includes frequency selection logic 311, Wifi driver 313, and transceiver 315. Frequency selection logic 311, implemented in software and hardware components, includes program instructions by which UAV 301 performs frequency selection for communication with ground controller 350 according to the technology disclosed herein, such as process 200. Frequency selection logic 311 directs Wifi driver 313 to receive interference data for the communication frequencies available to UAV 301 and to return one or more resource units selected based on a frequency selection process, such as process 200 of FIG. 2. Wifi driver 313 receives interference data for the frequencies from transceiver 315 and sends the interference data to frequency selection logic 311. Transceiver 315 sends and receives wireless communication from ground controller 350. It may be appreciated that in some implementations frequency selection logic 311 may be implemented in Wifi driver 313.

Flight control subsystem 320 includes operating system 321, application software 323, and camera 325. Operating system 321, executed by a flight control processor (not shown) of flight control subsystem 320, controls the operation of the various components of flight control subsystem 320 including application software 323 and camera 325 as well as components of communication subsystem 310 and electromechanical subsystem 330. Camera 325 is representative of one or more cameras or devices for capturing imaging data, such as video or still photography, across visible and other wavelengths of the electromagnetic spectrum, such as ultraviolet or infrared wavelengths.

Flight control subsystem 320 may also include various sensors, such as an inertial measurement unit sensor, GPS sensor, and environmental sensors such as altimeters, barometers, and anemometers. Flight control subsystem may also include data storage such as persistent or nonvolatile memory or a removeable memory card (e.g., an SD card) for recording flight and sensor data gathered from onboard devices, including photos or video captured by onboard cameras.

Electromechanical system 330 provides the propulsion for UAV 301, typically including an electronic speed controller which throttles one or more rotors according to flight instructions received from flight control subsystem 320. It may be appreciated that both flight control subsystem 320 and electromechanical subsystem 330 can include other elements in addition to (or in place of) those disclosed herein, which are illustrated for exemplary purposes.

In an operational scenario, camera 325 captures video data for transmission to ground controller 350. Camera 325 transmits the captured video to application software 323 for post-processing operations such as filtering, compression, and encoding. Application software 323 sends the processed video data to Wifi driver 313 for transmission to ground controller 350. Wifi driver 313 configures the video data for transmission by transceiver 315 via a Wifi data link to ground controller 350. UAV 301 establishes a connection with ground controller 350 over Wifi data links (i.e., uplink and downlink). Communication between transceiver 315 of communication subsystem 310 and transceiver 355 of ground controller 350 occurs over Wifi frequencies (e.g., RUs) selected by frequency selection logic 311 from among allocations of subcarrier frequencies of a Wifi carrier frequency and implemented by Wifi driver 313.

FIG. 4 illustrates operational scenario 400 of frequency selection by a UAV, as a Wifi access point, for communication with ground station and referring to elements of systems architecture 300 in an implementation.

In operational scenario 400, UAV 301, of which vehicle 110 of FIG. 1 is representative, selects a resource unit for uplink transmissions by ground controller 350. In some implementations, UAV 301 identifies an uplink resource unit by scanning available frequencies or resource units and determining a resource unit for transmission based on environmental conditions or performance characteristics, such as an interference profiles or SNRs of the resource units. As illustrated in operational scenario 400, UAV 301 selects a resource unit for the uplink from among eight available resource units. The eight available resource units may be resource units of an RU-26 allocation of a frequency band, such as a 5 MHz, 10 MHz, or 20 MHz frequency band. Each resource unit may include 26 subcarriers of the carrier frequency selected by UAV 301 for uplink transmission.

UAV 301 sends an indication of the selected resource unit ("RU-3") to ground controller 350. Ground controller 350 implements the selected resource unit for its uplink transmissions to UAV 301. UAV 301 may also send other uplink parameters, such as a transmission power and duration, along with the selected resource unit.

UAV 301 may also select an operation schedule for its connection with ground controller 350. In some implementations, the operation schedule coordinates the uplinks and downlinks for a half-duplex mode of operation. For example, the operation schedule, examples of which are illustrated in FIG. 6, may indicate the order and duration of uplink and downlink signals transmitted between UAV 301 and ground controller 350.

Continuing with operational scenario 400, upon implementing the selected resource unit and operation schedule, UAV 301 and ground controller 350 communicate by exchanging uplink and downlink data. In various implementations, Wifi driver 313 transmits downlink data, via transceiver 315, to transceiver 355 of ground controller 350 according to the operation schedule. Wifi driver 353 of ground controller 350 transmits uplink data, via transceiver 355, to transceiver 315 and Wifi driver 313 of UAV 301. The uplink data is carried on the RU-3 per the selection made by frequency selection logic 311.

During operation of UAV 301, frequency selection logic 311 select a new uplink resource unit such as when the cycle time of the current resource unit (RU-3) has expired or if the interference profile of the current resource unit indicates a significant degradation in transmission performance. Frequency selection logic 311 selects the new resource unit (RU-8). In some scenarios, the new resource unit may be specified by frequency selection logic 311 to be different from the current resource unit, for example, to comply with a regulatory framework, while in other scenarios, the new resource unit may continue to be the current resource unit. As illustrated, having selected the new resource unit, UAV 301 transmits the new selection to ground controller 350 which implements the selection for its next uplink transmissions.

The process illustrated operational scenario 400 may continue in the illustrated manner (periodically selecting a new resource unit to replace a current resource unit) for uplink transmission. The new resource unit may be selected from a current allocation of resource units (e.g., an RU-26 allocation of the current carrier frequency) or from a new allocation of resource units for a newly selected carrier frequency.

FIG. 5 illustrates allocations of subcarriers for resource units of a frequency band or carrier frequency with a given bandwidth according to the 802.11ax standard. Spectrum diagram 500 illustrates the resource unit allocation for a 40 MHz spectrum, where each resource unit includes 26 subcarriers with a subcarrier spacing of 78.125 kHz. Based on the 26-subcarrier allotments, the RU-26 allocation has 18 resource units with each resource unit having 2 MHz bandwidth. Similarly, spectrum diagram 510 illustrates the resource unit allocation for a 20 MHz spectrum based on 26-subcarrier resource units and a subcarrier spacing of 78.125 kHz. As illustrated in spectrum diagram 510, the 26-subcarrier allotments create an RU-26 allocation of 9 resource units, each with a 2 MHz bandwidth (with the middle RU split across a middle set of direct control subcarriers). Spectrum diagrams 500 and 510 also includes null and guard subcarriers for resource unit spacing.

In an implementation, the frequency selection logic of a UAV or of the ground controller selects a resource unit of an RU-26 allocation for the uplink transmission from the ground controller to the UAV. The single uplink resource unit may be selected from among the nine available resource units illustrated in spectrum diagram 510 where the bandwidth of the selected carrier frequency is 20 MHz. In scenarios where the communication channel has a 40 MHz bandwidth, the 40 MHz bandwidth may be used as half-ranges 501 and 503 of 20 MHz each, with each half-range comprising 9 resource units. For example, the vehicle may select a series of resource units from half-range 501 of spectrum diagram 500, then hop to half-range 503 to continue the resource unit selection process.

FIG. 6 illustrates operation schedules 600 and 610 for uplink and downlink communication between a UAV and a ground controller based on a single uplink resource unit (not shown) in an implementation. In an implementation and in accordance with European Union regulations, the channel observation time is approximately 1 second, and the dwell time is approximately 10 milliseconds, with uplink signals using less than 1 millisecond. This results in a 10% duty cycle. Operation schedules 600 and 610 are defined according to 10 millisecond operating cycles.

In operation schedule 600, two downlink transmissions, including video and status data, are transmitted to the ground controller for 4 milliseconds, with each downlink transmission followed by a 0.1 millisecond acknowledgement from the ground controller to the UAV over a single uplink resource unit. Following the second acknowledgement, the UAV sends a 0.6 millisecond trigger frame to the ground controller which responds by sending a C2 packet in a 0.5 millisecond transmission to the UAV via the single uplink resource unit. In response, the UAV sends an 0.1 millisecond acknowledgement of the C2 packet. In sum, downlink transmissions are approximately 8.7 milliseconds, while uplink transmissions are approximately 0.7 milliseconds, for a total transmission time of 9.4 milliseconds during the 10 millisecond cycle. In operation schedule 610, the cycle includes just a single uplink transmission of C2 data in response to the downlink trigger frame, for a total transmission time of 9.2 milliseconds during the 10 millisecond cycle.

FIG. 7 illustrates RU-hopping sequence 700 for resource unit cycling across a 40 MHz band using a single uplink resource unit in an implementation. In RU-hopping sequence 700, an occupancy requirement may specify that a hopping frequency of a hopping sequence is not to exceed 4*(dwell time)*(# of RUs). If eight resource units are available for uplink switching, for a 10-millisecond dwell time, the result is a hopping frequency of 320 milliseconds. To comply with this requirement, the 320-second interval is divided into two 160-millisecond cycles, one for each of two 20 MHz bands of the 40 MHz frequency band. Setting aside 20 milliseconds for channel switching, this leaves 140 milliseconds of resource unit cycling. Thus, based on a 10-ms duty cycle per-RU, 14 resource units may be used per 20-MHz hopping sequence, which in turn means that six of the eight resource units are used twice, and two of the eight resource units are used once on each 20 MHz band. RU-hopping sequence 700 may also be implemented on individual 20 MHz bands, that is, 20 MHz bands which are not half-bands of a 40 MHz band.

FIG. 8 illustrates a trigger frame PPDU 800 for downlink transmission (i.e., from the drone as access point to the ground controller as client) in portions 801, 803, and 805 in an implementation. Generally, PPDUs are configured to include a preamble, a header, and a payload. The trigger frame PPDU includes, in portion 801, a MAC header followed fields for common information (of up to 64 bits) and user information (of up to 40 bits). In portion 801, the frame control field indicates the frame type (in this example, a trigger frame) and "duration" refers to a transmission opportunity time for the uplink.

Portion 803 of trigger frame PPDU 800 illustrates a 64-bit common information portion of trigger frame PPDU 800, including information which would be common to clients of the access point (such as in scenarios where multiple clients of the access point are simultaneously communicating with the access point via OFDMA). Portion 803 includes information for the client on how to construct an uplink PPDU, such as a frame type, a transmission length, transmission power, and other transmission parameters along with other trigger-specific information common to multiple clients.

Portion 805 illustrates the 40-bit user-specific fields of trigger frame PPDU 800. The user-specific fields of portion 805 include an RU allocation field indicating the resource unit selected by the UAV for single resource unit uplink transmission by the ground controller.

FIG. 9 illustrates an operational scenario including UAV 901 as an access point for ground controller 910, a second ground controller 920, and a second UAV 903 in communication with ground controller 920 (e.g., receiving command and control data from ground controller 920 and transmitting video and operational data to ground controller 920). UAV 901 transmits downlink data to ground controller 910 via downlink 913 and receives uplink data sent from ground controller 910 via uplink 911. UAV 901 also transmits downlink data to ground controller 920 via downlink 923 and receives uplink data sent from ground controller 920 on uplink 921.

As an access point, UAV 901 is in communication simultaneously with ground controllers 910 and 920 via OFDMA. UAV 901 may, in some implementations, relay communications between UAV 903 and ground controller 920, for example, if UAV 903 is beyond the range of ground controller 920. Although two UAVs and two ground controllers are illustrated in operational scenario 900, it may be appreciated that multiple ground controllers may be communicating with multiple UAVs via UAV 901 as an access point.

In an implementation, UAV 901 designates a single resource unit of a frequency band for uplink with ground controller 910 (RU-5) and a second single resource unit (RU-2) of the same or other frequency band for uplink with ground controller 920, as illustrated in uplink profiles 912 and 922, respectively. UAV 901 sends, according to an operation schedule, trigger frame PPDUs, of which trigger frame PPDU 800 of FIG. 8 is representative, to each of ground controllers 910 and 920. The trigger frame PPDUs identify the specific uplink resource unit for each of ground controllers 910 and 920 and may also instruct ground controllers 910 and 920 to transmit uplink traffic only on the selected resource units. Upon receiving the trigger frame PPDU, each of ground controllers 910 and 920 transmit uplink data to UAV 901.

In some implementations, UAV 901 selects new uplink resource units for the ground controllers with which it is in communication. For example, if the operation schedule specifies 10-millisecond operating cycles with RU hopping, UAV 901 may select a new uplink resource unit for each of ground controllers 910 and 920. UAV 901 then sends a trigger frame PPDU to instruct ground controllers 910 and 920 to transmit uplink data via the newly selected uplink resource units and may also instruct ground controllers 910 and 920 only on the newly selected resource units. In various implementations, the newly selected uplink resource units may be on the same frequency band or of the same resource unit allocation as the current resource unit, or UAV 901 may shift to a new carrier frequency and select resource units allocated on the frequency band of the new frequency. In various implementations, the selected uplink resource units include 26 sub-carrier frequencies. Upon transmitting the trigger frame PPDUs to ground controllers 910 and 920, ground controllers 910 and 920 configure their respective Wifi drivers and/or transceivers for transmitting on the newly selected uplink resource units, then transmit uplink data to UAV 901 accordingly. UAV 901 receives the uplink traffic from ground controllers 910 and 920 via the newly selected resource units.

A technical benefit of enabling simultaneous communication with multiple ground controllers via multiple assigned uplink resource units is improved latency in uplink transmission which is critical to drone operation. By assigning each of the multiple ground controllers to a single, dedicated resource unit, the network of ground controllers and the drone leverages signal orthogonality to share bandwidth to transmit the uplink traffic simultaneously and without contention or conflicts, resulting in improved transmission efficiency and latency and increased throughput.

In an implementation, UAV 901 is in communication with UAV 903 including uplink 931 and downlink 933, where UAV 901 is an access point for UAV 903 as a non-access point or client. UAV 901 receives uplink data from ground controller 920 on uplink 921 and transmits the uplink data (as downlink data) to UAV 903 via downlink 933. Similarly, UAV 901 receives uplink data from UAV 903 via uplink 931 and transmits the uplink data (as downlink data) to ground controller 920 on downlink 923.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating an unmanned aerial vehicle, comprising:
establishing a connection between the unmanned aerial vehicle and a ground controller in accordance with a wireless protocol that divides radio frequency (RF) spectrum into bands of resource units with respect to uplinks and downlinks between access points and non-access points, wherein the unmanned aerial vehicle serves as an access point with respect to the ground controller and wherein the connection includes an uplink and a downlink;
identifying a single resource unit in a band of resource units to support uplink traffic by:
performing a scan of a first RF band among the RF spectrum;
determining environment conditions in the first RF band based on the scan; and
selecting the single resource unit based on the environment conditions;
instructing the ground controller to transmit the uplink traffic on the single resource unit and responsively receiving the uplink traffic from the ground controller on the single resource unit; and
identifying a new single resource unit to support the uplink traffic in a subsequent transmission by:
evaluating the single resource unit against a cycle time corresponding to an allowed duration of transmission time of the uplink traffic; and
selecting the new single resource unit from the band of resource units or from a different band of resource units responsive to determining that a duration of transmission time of the uplink traffic exceeds the cycle time.

2. The method of claim 1, wherein the wireless protocol comprises an orthogonal frequency division multiple access (OFDMA) protocol, and wherein each resource unit in the band of resource units comprises a group of sub-carrier frequencies in the RF spectrum, and wherein the method further comprises:
identifying one or more other resource units to carry downlink traffic; and
transmitting the downlink traffic to the ground controller on the one or more other resource units.

3. The method of claim 2, further comprising:
instructing the ground controller to transmit the uplink traffic on the new single resource unit; and
receiving the uplink traffic on the new single resource unit.

4. The method of claim 3, wherein instructing the ground controller to transmit the uplink traffic on the single resource unit comprises instructing the ground controller to transmit the uplink traffic on only the single resource unit.

5. The method of claim 1, wherein the unmanned aerial vehicle further serves as an access point with respect to one or more other unmanned aerial vehicles and one or more other ground controllers.

6. The method of claim 5, further comprising:
establishing a second connection with a second ground controller in accordance with the wireless protocol, wherein the second connection includes a second uplink and a second downlink;
identifying a second single resource unit in a second band of resource units to support second uplink traffic;
instructing the second ground controller to transmit the second uplink traffic on the second single resource unit; and
receiving the second uplink traffic from the second ground controller on the second single resource unit.

7. The method of claim 6, further comprising:
establishing a third connection with a second unmanned aerial vehicle in accordance with the wireless protocol, wherein the third connection includes a third uplink and a third downlink;

receiving third uplink traffic from the second unmanned aerial vehicle on the third uplink; and transmitting third downlink traffic from the unmanned aerial vehicle to the second unmanned aerial vehicle on the third downlink.

8. The method of claim 7, wherein the third downlink traffic, sent from the unmanned aerial vehicle to the second unmanned aerial vehicle on the third downlink, includes the second uplink traffic sent from the second ground controller to the unmanned aerial vehicle on the second uplink.

9. An unmanned aerial vehicle comprising:

one or more non-transitory computer-readable storage media; and program instructions stored on the one or more computer-readable storage media that, when executed by one or more processors, direct the unmanned aerial vehicle to at least:

establish a connection between the unmanned aerial vehicle and a ground controller in accordance with a wireless protocol that divides radio frequency (RF) spectrum into bands of resource units with respect to uplinks and downlinks between access points and non-access points, wherein the unmanned aerial vehicle serves as an access point with respect to the ground controller and wherein the connection includes an uplink and a downlink;

scan a first RF band among the RF spectrum to determine environmental conditions in the first RF band based on the scan;

select a single resource unit in a band of resource units to support uplink traffic based on the environmental conditions;

instruct the ground controller to transmit the uplink traffic on the single resource unit;

receive the uplink traffic from the ground controller on the single resource unit; and identify a new single resource unit to support the uplink traffic in a subsequent transmission, wherein to identify the new single resource unit, the program instructions direct the unmanned aerial vehicle to:

evaluate the single resource unit against a cycle time corresponding to an allowed duration of transmission time of the uplink traffic; and select the new single resource unit from the band of resource units or from a different band of resource units responsive to determining that a duration of transmission time of the uplink traffic exceeds the cycle time.

10. The unmanned aerial vehicle of claim 9, wherein the wireless protocol comprises an orthogonal frequency division multiple access (OFDMA) protocol, and wherein each resource unit in the band of resource units comprises a group of sub-carrier frequencies in the RF spectrum, and wherein the program directions further direct the unmanned aerial vehicle to:

identify one or more other resource units to carry downlink traffic; and transmit the downlink traffic to the ground controller on the one or more other resource units.

11. The unmanned aerial vehicle of claim 10, wherein the program instructions further direct the unmanned aerial vehicle to:

instruct the ground controller to transmit the uplink traffic on the new single resource unit; and receive the uplink traffic on the new single resource unit.

12. The unmanned aerial vehicle of claim 11, wherein to instruct the ground controller to transmit the uplink traffic on the single resource unit, the program instructions direct the unmanned aerial vehicle to instruct the ground controller to transmit the uplink traffic on only the single resource unit.

13. The unmanned aerial vehicle of claim 9, wherein the unmanned aerial vehicle further serves as an access point with respect to one or more other unmanned aerial vehicles and one or more other ground controllers.

14. The unmanned aerial vehicle of claim 13, wherein the program instructions further direct the unmanned aerial vehicle to:

establish a second connection with a second ground controller in accordance with the wireless protocol, wherein the second connection includes a second uplink and a second downlink;

identify a second single resource unit in a second band of resource units to support second uplink traffic;

instruct the second ground controller to transmit the second uplink traffic on the second single resource unit; and receive the second uplink traffic from the second ground controller on the second single resource unit.

15. The unmanned aerial vehicle of claim 14, wherein the program instructions further direct the unmanned aerial vehicle to:

establish a third connection with a second unmanned aerial vehicle in accordance with the wireless protocol, wherein the third connection includes a third uplink and a third downlink;

receive third uplink traffic from the second unmanned aerial vehicle on the third uplink; and transmit third downlink traffic from the unmanned aerial vehicle to the second unmanned aerial vehicle on the third downlink.

16. The unmanned aerial vehicle of claim 15, wherein the third downlink traffic, sent from the unmanned aerial vehicle to the second unmanned aerial vehicle on the third downlink, includes the second uplink traffic sent from the second ground controller to the unmanned aerial vehicle on the second uplink.

17. A ground controller comprising:

one or more non-transitory computer-readable storage media; and program instructions stored on the one or more computer-readable storage media that, when executed by one or more processors, direct the ground controller to at least:

establish a connection between the ground controller and an unmanned aerial vehicle in accordance with a wireless protocol that divides radio frequency (RF) spectrum into bands of resource units with respect to uplinks and downlinks between access points and non-access points, wherein the unmanned aerial vehicle serves as an access point with respect to the ground controller and wherein the connection includes an uplink and a downlink;

receive, from the unmanned aerial vehicle, an instruction to transmit uplink traffic on a single resource unit in a band of resource units selected based on:

performing a scan of a first RF band among the RF spectrum to determine environmental conditions in the first RF band based on the scan; and selecting the single resource unit based on the environment conditions; and transmit the uplink traffic from the ground controller on the single resource unit; and receive, from the unmanned aerial vehicle, a further instruction to transmit the uplink traffic on a new single resource unit selected based on:

evaluating the single resource unit against a cycle time corresponding to an allowed duration of transmission time of the uplink traffic; and selecting the new single resource unit from the band of resource units or from a different band of resource units responsive to determining that a duration of transmission time of the uplink traffic exceeds the cycle time.

18. The ground controller of claim 17, wherein the wireless protocol comprises an orthogonal frequency division multiple access (OFDMA) protocol, and wherein each resource unit in the band of resource units comprises a group of sub-carrier frequencies in the RF spectrum, and wherein the program directions further direct the ground controller to:

receive, from the unmanned aerial vehicle, an instruction to receive downlink traffic on one or more other resource units; and receive the downlink traffic from the unmanned aerial vehicle on the one or more other resource units.

19. The ground controller of claim 18, wherein the program instructions further direct the ground controller to:

transmit the uplink traffic on the new single resource unit.

20. The ground controller of claim 19, wherein the instruction to transmit the uplink traffic on the single resource unit, further comprise an instruction to transmit the uplink traffic on only the single resource unit.

\* \* \* \* \*